United States Patent
Matsuda et al.

(10) Patent No.: US 7,492,618 B2
(45) Date of Patent: Feb. 17, 2009

(54) INVERTER DEVICE

(75) Inventors: Kensaku Matsuda, Tokyo (JP); Shinzou Tomonaga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/586,243

(22) PCT Filed: Jan. 14, 2005

(86) PCT No.: PCT/JP2005/000403

§ 371 (c)(1),
(2), (4) Date: Jul. 17, 2006

(87) PCT Pub. No.: WO2006/075388

PCT Pub. Date: Jul. 20, 2006

(65) Prior Publication Data

US 2007/0153556 A1    Jul. 5, 2007

(51) Int. Cl.
*H02H 7/122* (2006.01)
(52) U.S. Cl. .............. 363/56.05; 363/56.01; 363/56.02; 363/56.08; 363/56.11; 363/56.04; 363/56.12; 363/58
(58) Field of Classification Search .............. 363/56.05, 363/56.01, 56.02, 56.04, 56.08, 56.11, 56.12, 363/58
See application file for complete search history.

(56) References Cited

U.S. PATENT DOCUMENTS 6,211,706 B1    4/2001   Choi et al.
6,459,598 B1 *  10/2002  Yamamoto et al. ....... 363/56.01

FOREIGN PATENT DOCUMENTS

| JP | 6-84798 U | | 12/1994 |
|---|---|---|---|
| JP | 10-42575 | * | 2/1998 |
| JP | 10-42575 A | | 2/1998 |
| JP | 3577478 B2 | | 7/2004 |
| TW | 1220591 | | 5/1992 |
| WO | WO 01/59918 A1 | | 8/2001 |

* cited by examiner

*Primary Examiner*—Akm E Ullah
*Assistant Examiner*—Jue Zhang
(74) *Attorney, Agent, or Firm*—Sughrue Mion, PLLC

(57) ABSTRACT

An inverter device includes an inverter circuit, an inverter driving unit, and a clamp diode. The inverter circuit includes an upper arm unit and a lower arm unit connected in series. The upper arm unit and the lower arm unit include switching elements that drive a load. The inverter driving unit includes a high-withstand-voltage IC that drives the switching elements of the upper arm unit and the lower arm unit. The high-withstand-voltage IC has a first terminal for supplying a reference voltage to the lower arm unit and a second terminal for supplying a high-voltage to the upper arm unit. The clamp diode clamps a potential difference between the first terminal and the second terminal.

15 Claims, 5 Drawing Sheets

INVERTER DEVICE

TECHNICAL FIELD

The present invention relates to an inverter device. More specifically, the present invention relates to an inverter device including a high-withstand-voltage IC that performs drive control on a switching element of an inverter circuit.

BACKGROUND ART

In a typical inverter device, a switching element is used to drive a load. Moreover, a high-withstand-voltage IC is used to drive control the switching of the switching element. A negative surge, however, is generated when the switching element performs switching. The negative surge is generated due to a variation in current per unit time (di/dt) and inductance of the wiring. Patent Document 1 discloses a technology for suppressing the generation of the negative surge. Specifically, Patent Document 1 teaches to connect a clamp diode between a low-voltage reference terminal and a high-voltage reference terminal of the high-withstand-voltage IC.

A negative voltage generated due to a small inductance resulting from a chip pattern, wiring, and the like, is the prime cause of the breakdown of the high-withstand-voltage IC. In the technology disclosed in Patent Document 1, the negative voltage is clamped by using the clamp diode to prevent the breakdown of the high-withstand-voltage IC.

On the other hand, Patent Document 2 teaches to provide a voltage divider circuit (resistance element) in series with the clamp diode in the configuration disclosed in Patent Document 1.

Not all the negative voltage, however, can be suppressed with the clamp diode. In the technology disclosed in Patent Document 2, the negative voltage, which cannot be suppressed with the clamp diode, is divided by using the clamp diode and the resistance element of the voltage divider circuit to reduce the level of the negative voltage applied to the high-withstand-voltage IC.

[Patent Document 1] Japanese Patent Application Laid-open No. 10-42575

[Patent Document 2] Japanese Patent No. 3577478

DISCLOSURE OF INVENTION

Problem to be Solved by the Invention

However, in the technology disclosed in Patent Document 1, there is a possibility that the circulating current flows through the clamp diode itself. As a result, a diode of a larger current rating (a diode of substantially the same rating as the reverse-parallel connected diode) needs to be used. This is disadvantageous, because diodes of larger current rating are relatively costlier and bigger.

On the other hand, in the technology disclosed in Patent Document 2, there is a possibility that a circulating current flows through both the clamp diode and the voltage divider circuit. As a result, a larger current rating and a larger current rating resistance element need to be used. This is disadvantageous, because diodes of larger current rating are relatively costlier and bigger. Moreover, larger current rating resistance elements are relatively costlyier and bigger.

A typical high-withstand-voltage IC includes, for example, an input buffer, an MOS transistor, a resistor, a driver circuit, and the like. Therefore, if a negative voltage described as above is generated, sometimes a through current flows through parasitic capacitance of the MOS transistor into the high-withstand-voltage IC thereby generating a phenomenon called as latch-up. The latch-up phenomenon is a phenomenon in which the driver circuit of the high-withstand-voltage IC outputs an erroneous signal due to the presence of the through current. The conventional technologies disclosed in Patent Documents 1 and 2 have been insufficient for suppressing the generation of the latch-up phenomenon.

It is an object of the present invention to provide a technology that can prevent breakdown and malfunction (latch-up phenomenon) of a high-withstand-voltage IC in an inverter device without much increasing the circuit scale or cost.

Means For Solving Problem

To solve the above problems and to achieve the above objects, an inverter device according to an aspect of the present invention includes an inverter circuit that includes a bridge circuit connected between a positive electrode and a negative electrode of a direct-current power supply, the bridge circuit including an upper arm unit including an upper-arm switching element and an upper arm diode connected in reverse-parallel to each other; and a lower arm unit including a lower-arm switching element and a lower arm diode connected in reverse-parallel to each other, the lower arm unit being series connected with the upper arm unit; an inverter driving unit including a high-withstand-voltage IC that drives switching elements in the upper arm unit and the lower-arm unit, the high-withstand-voltage IC having a first terminal for supplying a reference voltage to the switching element in the lower arm unit and a second terminal for supplying a high-voltage to the switching element in the upper arm unit; and a clamp unit that clamps a potential difference between the first terminal and the second terminal.

According to the present invention, the clamp unit clamps a potential difference between the first terminal and the second terminal of the high-withstand-voltage IC. In other words, the clamp unit clamps the negative voltage that causes voltage breakdown of the high-withstand-voltage IC due to wiring inductance and circulating current, whereby the through current that is to flow into the high-withstand-voltage IC is reduced.

EFFECT OF THE INVENTION

According to the inverter device of the present invention, the clamping unit clamps the potential difference between the reference power-supply terminal of the high-withstand-voltage IC and the high-voltage power-supply terminal of the high-withstand-voltage IC. In other words, the clamp unit clamps a negative voltage that causes the voltage breakdown of the high-withstand-voltage IC, whereby a large portion of the through current is prevented from flowing into the high-withstand-voltage IC. Therefore, the inverter device can prevent occurrence of breakdown and malfunction (latch-up phenomenon) of the high-withstand-voltage IC, and suppresses increases in circuit scale and cost.

Figure 1:
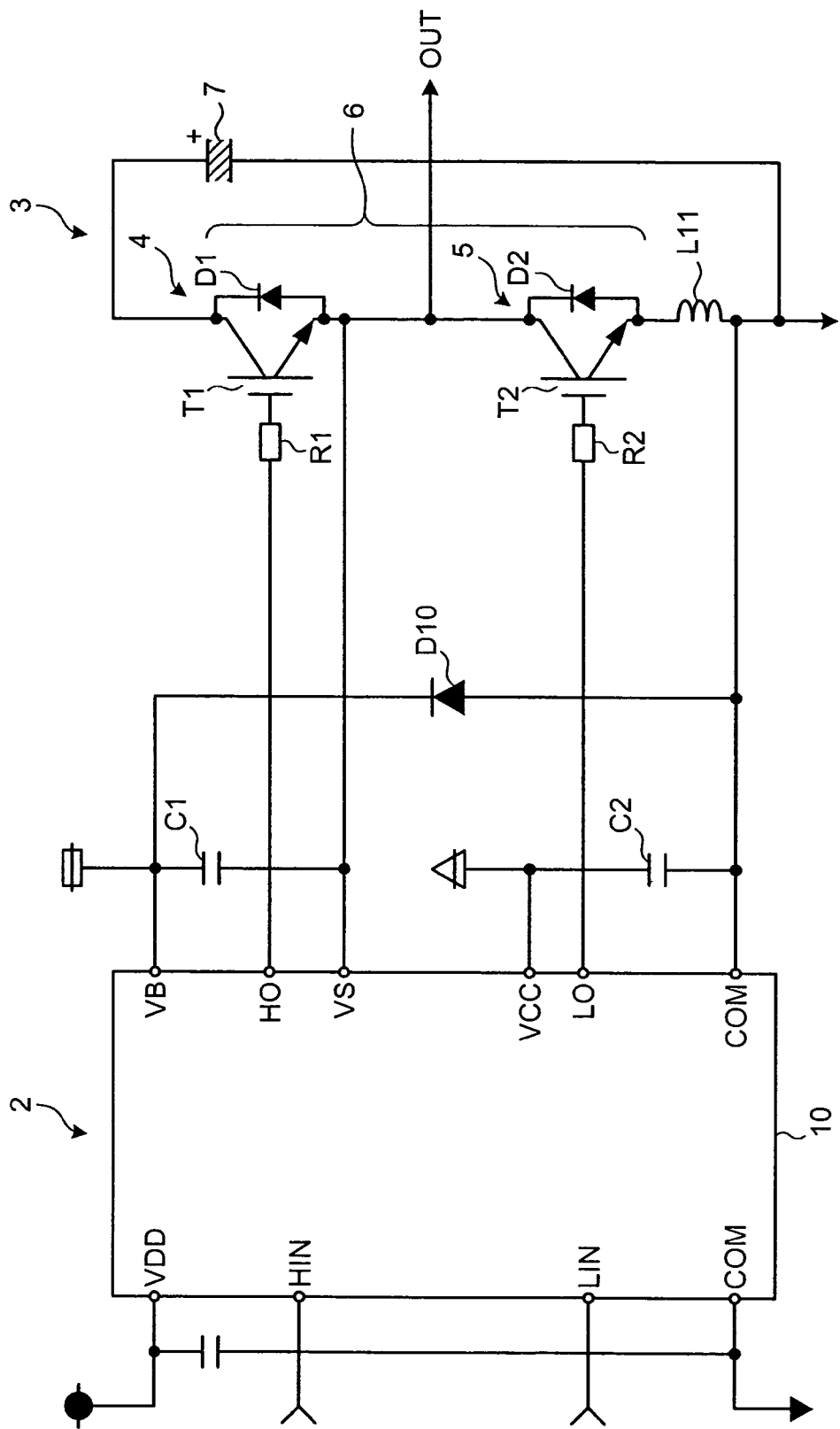
FIG. 1 is a schematic diagram for explaining an inverter device (single-phase inverter configuration) according to a first embodiment of the present invention.

EXPLANATIONS OF SYMBOLS 2, 2a inverter driving unit
3, 3a inverter circuit
4, 4a, 4b, 4c upper arm unit
5, 5a, 5b, 5c lower arm unit
6, 6a bridge circuit
7 DC power supply
8 load
10, 10a high-withstand-voltage IC
12 driver circuit
14 input buffer
16 NMOS transistor
20 resistor
C1, C2, C3, C5 decoupling capacitor
D1, D3, D5 upper-arm diode
D2, D4, D6 lower-arm diode
D10, D11, D12, D13, D21, D22, D23 clamp diode
D17 parasitic diode
R1, R2, R3, R4, R5, R6 gate resistor
T1, T3, T5 upper-arm switching element
T2, T4, T6 lower-arm switching element

BEST MODE(S) FOR CARRYING OUT THE INVENTION

Exemplary embodiments of the present invention will be described below in detail with reference to the accompanying drawings. The present invention is not limited to the embodiments.

First Embodiment

FIG. 1 is a schematic diagram for explaining an inverter device according to a first embodiment of the present invention. The inverter device is a typical single-phase inverter device. In other words, a high-withstand-voltage IC 10 of an inverter driving unit 2 drives both a switching element T1 in an upper arm and a switching element T2 in a lower arm of an inverter circuit 3. The inverter circuit 3 includes a bridge circuit 6 and a DC power supply 7. The bridge circuit 6 includes a series connected upper arm unit 4 and lower arm unit 5. The upper arm unit 4 includes the switching element (hereinafter, "upper-arm switching element") T1 of the upper arm and a diode (hereinafter, "upper-arm diode") D1 connected in reverse-parallel to each other. The lower arm unit 5 includes the switching element (hereinafter, "lower-arm switching element") T2 of the lower arm and a diode (hereinafter, "lower-arm diode") D2 connected in reverse-parallel to each other. In the bridge circuit 6, the positive electrode of the DC power supply 7 is connected to the collector of the upper-arm switching element T1, and the negative electrode of the DC power supply 7 is connected to the emitter of the lower-arm switching element T2.

The high-withstand-voltage IC 10 drives the upper-arm switching element T1 and the lower-arm switching element T2. The high-withstand-voltage IC 10 has various input/output terminals described below. Specifically, the high-withstand-voltage IC 10 has a terminal VDD that is a high-voltage power-supply terminal for controlling the high-withstand-voltage IC 10, a terminal COM that is a reference power-supply terminal also for controlling the high-withstand-voltage IC 10, an upper-arm control-signal input terminal HIN to which a control signal for controlling the upper arm unit 4 is input, a lower-arm control-signal input terminal LIN to which a control signal for controlling the lower arm unit 5 is input, an upper-arm-driving high-voltage power-supply terminal VB connected to a high-voltage driving power-supply that drives the upper arm unit 4, an upper-arm-driving reference power-supply terminal VS that is a reference terminal of the driving power supply that drives the upper arm unit 4, an upper-arm switching-element driving-signal output terminal HO from which a driving signal for driving the upper arm unit 4 is output, a lower-arm-driving high-voltage power-supply terminal VCC that is connected to a high-voltage driving power-supply that drives the lower arm unit 5, a lower-arm-driving reference power-supply terminal COM that is a reference terminal of the driving power supply that drives the lower arm unit 5, and a lower-arm switching-element driving-signal output terminal LO from which a driving signal for driving the lower arm unit 5 is output.

A decoupling capacitor C1 is connected between the upper-arm-driving high-voltage power-supply terminal VB and the upper-arm-driving reference power-supply terminal VS. Moreover, a decoupling capacitor C2 is connected between the lower-arm-driving high-voltage power-supply terminal VCC and the lower-arm-driving reference power-supply terminal COM.

The upper-arm switching-element driving-signal output terminal HO and a gate of the upper-arm switching element T1 are connected through a gate resistor R1 for controlling the gate current, and the upper-arm-driving reference power-supply terminal VS and an emitter of the upper-arm switching element T1 are connected directly. Similarly, the lower-arm switching-element driving-signal output terminal LO and a gate of the lower-arm switching element T2 are connected through a gate resistor R2, and the lower-arm-driving reference power-supply terminal COM and the emitter of the lower-arm switching element T2 are connected directly.

In the inverter device, wiring inductance is minimized as much as possible by taking measures such as connecting the upper-arm switching element T1 and the lower-arm switching element T2 with a plurality of wires (wire bundle), directly connecting these switching elements and the output terminals by bonding pads without wires, and providing a collector and an emitter of each switching element separately onto the front surface and the back surface of a substrate. A combined inductance L11 illustrated between the emitter of the lower-arm switching element T2 of the inverter circuit 3 and the lower-arm-driving reference power-supply terminal COM of the high-withstand-voltage IC 10 indicates the combined inductance in a circuit part including the lower-arm diode D2 through which circulating current flows. The combined inductance L11 can be suppressed to a value between about several nH (nano Henri) to about several dozens of nH by taking the aforementioned measures.

The circulating current flows only for a short period of time, that is, the variation in current per unit time (di/dt) is large. Therefore, even if the combined inductance of the circuit part where circulating current flows is made small, an induced voltage of about several volts is generated anyway in that part. The polarity of the induced voltage becomes negative in which, with respect to the potential of the lower-armdriving reference power-supply terminal COM as a reference, the potential of the upper-arm-driving reference power-supply terminal VS becomes negative. The voltage breakdown of the high-withstand-voltage IC occurs due to this negative voltage. Moreover, this negative voltage causes the latch-up phenomenon, that is, the phenomenon in which the driver circuit of the high-withstand-voltage IC 10 outputs an erroneous signal.

In the inverter device according to the first embodiment, a clamp diode D10 is provided as a clamping means. Specifically, the anode of the clamp diode D10 is connected to the lower-arm-driving reference power-supply terminal COM and the cathode is connected to the upper-arm-driving high-voltage power-supply terminal VB. This clamp diode D10 clamps a potential difference between the lower-arm-driving reference power-supply terminal COM and the upper-arm-driving high-voltage power-supply terminal VB. The position at which the clamp diode D10 according to the present invention is connected is different from the positions of the clamp diodes disclosed in above-mentioned Patent Documents 1 and 2.

Figure 2:
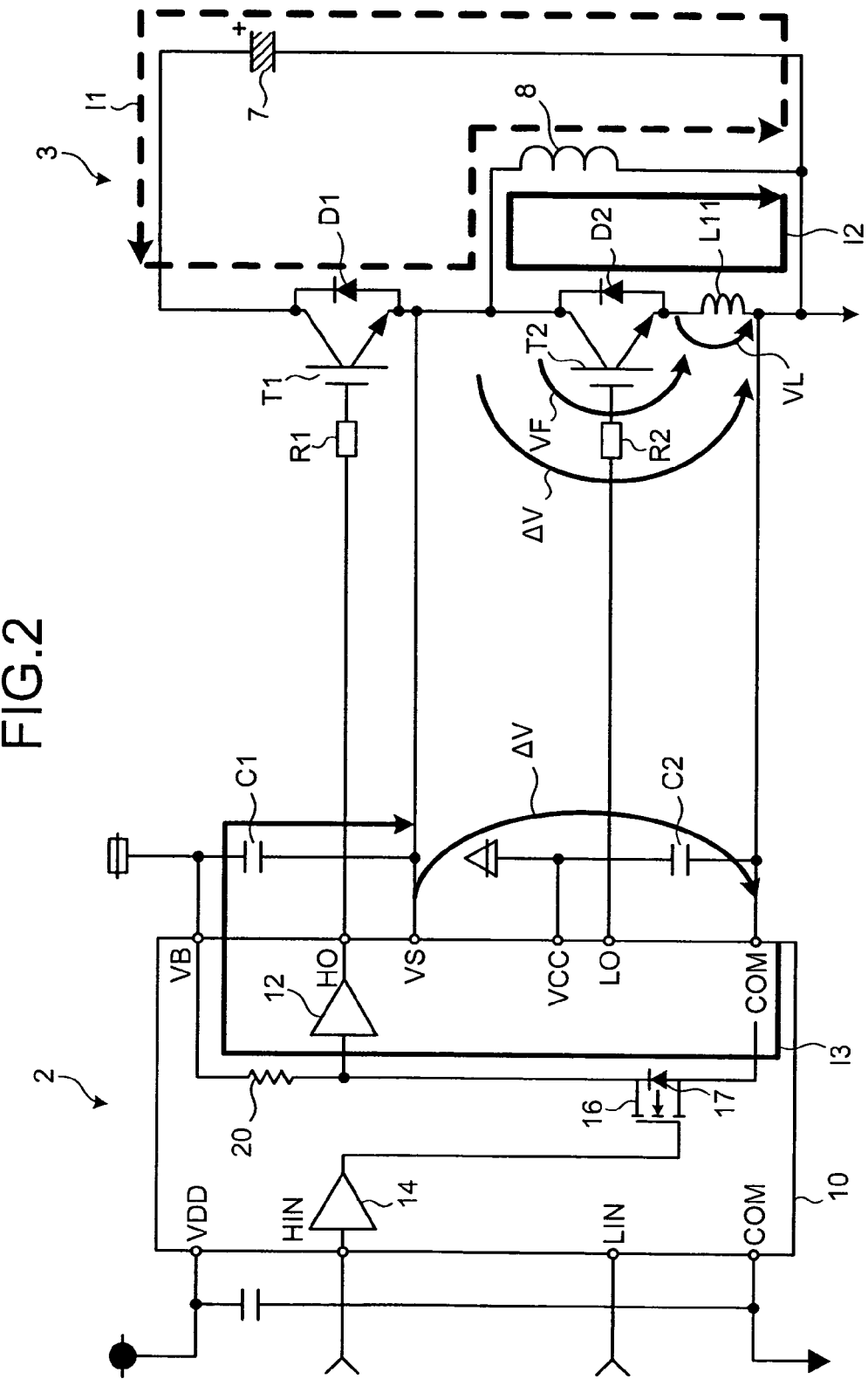
FIG. 2 is a schematic diagram for explaining malfunction of a high-withstand-voltage IC in an inverter device that does not include a clamp diode.
Figure 3:
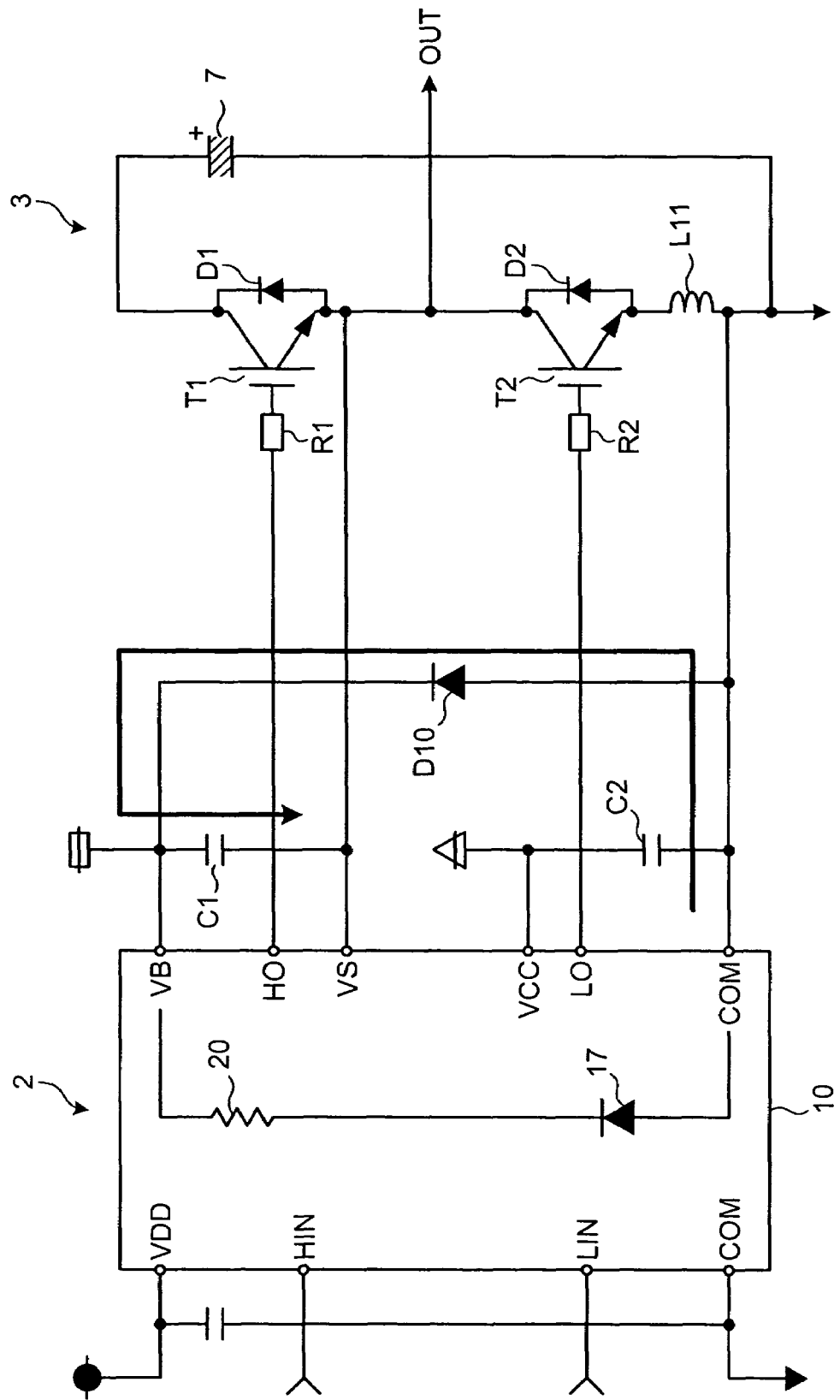
FIG. 3 is a schematic diagram for illustrating a state in which a through current flowing toward a high-withstandvoltage IC is drawn to a clamp diode in the inverter device according to the first embodiment.

The reason why the clamp diode D10 is connected between the lower-arm-driving reference power-supply terminal COM and the upper-arm-driving high-voltage power-supply terminal VB is described with reference to FIGS. 2 and 3. FIG. 2 is a diagram for explaining why malfunction of a high-withstand-voltage IC occurs in an inverter device that does not include a clamping means. FIG. 3 is a diagram illustrating a state in which through current that is to flow into a high-withstand-voltage IC is made to flow into the clamp diode in the inverter device according to the first embodiment.

In FIG. 2, the internal structure of the high-withstand-voltage IC 10 represented in FIG. 1 is illustrated in more detail. The high-withstand-voltage IC 10 includes an input buffer 14, an NMOS transistor 16, a parasitic diode 17, a resistor 20, and a driver circuit 12. The input terminal of the input buffer 14 is connected to the upper-arm control-signal input terminal HIN, and the output terminal is connected to the gate of the NMOS transistor 16. The parasitic diode 17 is connected to the NMOS transistor 16 in parallel. The collector of the NMOS transistor 16 is connected to the input terminal of the driver circuit 12. Moreover, the collector of the NMOS transistor 16 is also connected to the upper-arm-driving high-voltage power-supply terminal VB via the resistor 20 whose one end is connected to the input terminal of the driver circuit 12.

The mechanism by which the high-withstand-voltage IC 10 causes malfunction is described. When the upper-arm switching element T1 is turned on, a main circuit current I1, as shown with a dashed line, flows in a load 8 that has an inductance component. Subsequently, when the upper-arm switching element T1 is turned off, the current that was flowing through the load 8 starts flowing into the lower-arm diode D2 as a circulating current I2. The circulating current I2 has a steep gradient. As described above, because parts of the inverter circuit 3 are connected by patterns or wires, although very small, inductance components exist in these parts. Among these inductance components, an inductance component in the region where the circulating current I2 flows is denoted by the combined inductance L11 in the figure. An induced voltage VL that is generated in the combined inductance L11 due to flow of the circulating current I2 can be expressed by the following Equation (1).

$$VL = L11 \times (di/dt) \tag{1}$$

The lower the impedance of the load 8 is, the steeper the gradient of the circulating current I2 (that is, larger the ration di/dt in Equation (1)) becomes. In other words, the lower the impedance of the load 8 is, the higher the induced voltage VL is.

Furthermore, an on voltage VF is generated across the lower-arm diode D2 when the circulating current I2 flows. As a result, a potential difference expressed by the following Equation (2) occurs between the emitter of the upper-arm switching element T1 and the emitter of the lower-arm switching element T2.

$$\Delta V = VL + VF \tag{2}$$

The emitter of the upper-arm switching element T1 and the emitter of the lower-arm switching element T2 are connected to the upper-arm-driving reference power-supply terminal VS and the lower-arm-driving reference power-supply terminal COM, respectively. Therefore, a voltage ΔV expressed by Equation (2) is applied across these terminals.

When the voltage ΔV is applied across the upper-arm-driving reference power-supply terminal VS and the lower-arm-driving reference power-supply terminal COM of the high-withstand-voltage IC 10, a through current I3 flows from the parasitic diode 17 through the resistor 20. This through current I3 is the main cause of the latch-up phenomenon in which the driver circuit 12 outputs an erroneous signal.

In the inverter device according to the first embodiment, however, as shown in FIG. 3, the clamp diode D10 is provided between the lower-arm-driving reference power-supply terminal COM and the upper-arm-driving high-voltage power-supply terminal VB. Because of this clamp diode D10, the through current I3, which would flow through the high-withstand-voltage IC 10 in the circuit configuration represented in FIG. 2, is made to flow into the clamp diode D10. A portion of the through current I3 may flow through the high-withstand-voltage IC 10. However, a substantially large portion of the through current I3 is drawn to the clamp diode D10. The reason is that, the impedance of the clamp diode D10 connected between the same terminals, i.e., the terminals COM and VB, is smaller than an impedance of the series circuit configured with a parasitic diode D17 and the resistor 20 through which the through current I3 flows in the high-withstand-voltage IC 10. Accordingly, the through current I3 that flows through the high-withstand-voltage IC 10 can be reduced substantially, and malfunction of the high-withstand-voltage IC 10 caused due to the latch-up phenomenon can be prevented from occurring.

In the inverter devices disclosed in Patent Documents 1 and 2, on the other hand, the cathode of the clamp diode is connected to the upper-arm-driving reference power-supply terminal VS. Therefore, the effect of drawing the through current in the configuration disclosed in Patent Documents 1 and 2 is smaller than that in the case of the clamp diode D10 of the first embodiment.

In the inverter device according to the first embodiment, the cathode of the clamp diode D10 is connected to the upper-arm-driving high-voltage power-supply terminal VB (for example, +15V terminal) of the high-withstand-voltage IC 10. Therefore, the current flowing through the clamp diode D10 can be reduced compared to the current flowing through the clamp diode, for example, disclosed in Patent Documents 1 and 2. Hence, a diode of a smaller current rating compared to the clamp diode disclosed in Patent Documents 1 and 2 can be selected for the clamp diode D10.

As described above, in the inverter device according to the first embodiment, the clamp diode D10 is provided between the lower-arm-driving reference power-supply terminal COM and the upper-arm-driving high-voltage power-supply terminal VB of the high-withstand-voltage IC 10. The clamp diode D10 clamps a potential difference between the lower-arm-driving reference power-supply terminal COM and the upper-arm-driving high-voltage power-supply terminal VB. As a result, breakdown and malfunction of the high-withstand-voltage IC 10 can be prevented without increasing the circuit scale or cost.

In the first embodiment, the clamp diode D10 is shown outside of the high-withstand-voltage IC; however, the clamp diode D10 can be provided inside of the high-withstand-voltage IC. However, it is advantageous to provide the clamp diode outside of the high-withstand-voltage IC; because, in that case it is not necessary to change the design of the high-withstand-voltage IC, i.e., the first embodiment can be applied to an inverter device employing an existing high-withstand-voltage IC.

Furthermore, in the first embodiment, a diode is used as the clamping means; however, the clamping means is not limited to a diode. Any element that turns on at a voltage higher than a certain value and that can output an approximately constant voltage can be used as the clamping means. As the clamping means, for example, a PN junction of a Zener diode or a PN junction of a bipolar transistor can be used.

Second Embodiment

Figure 4:
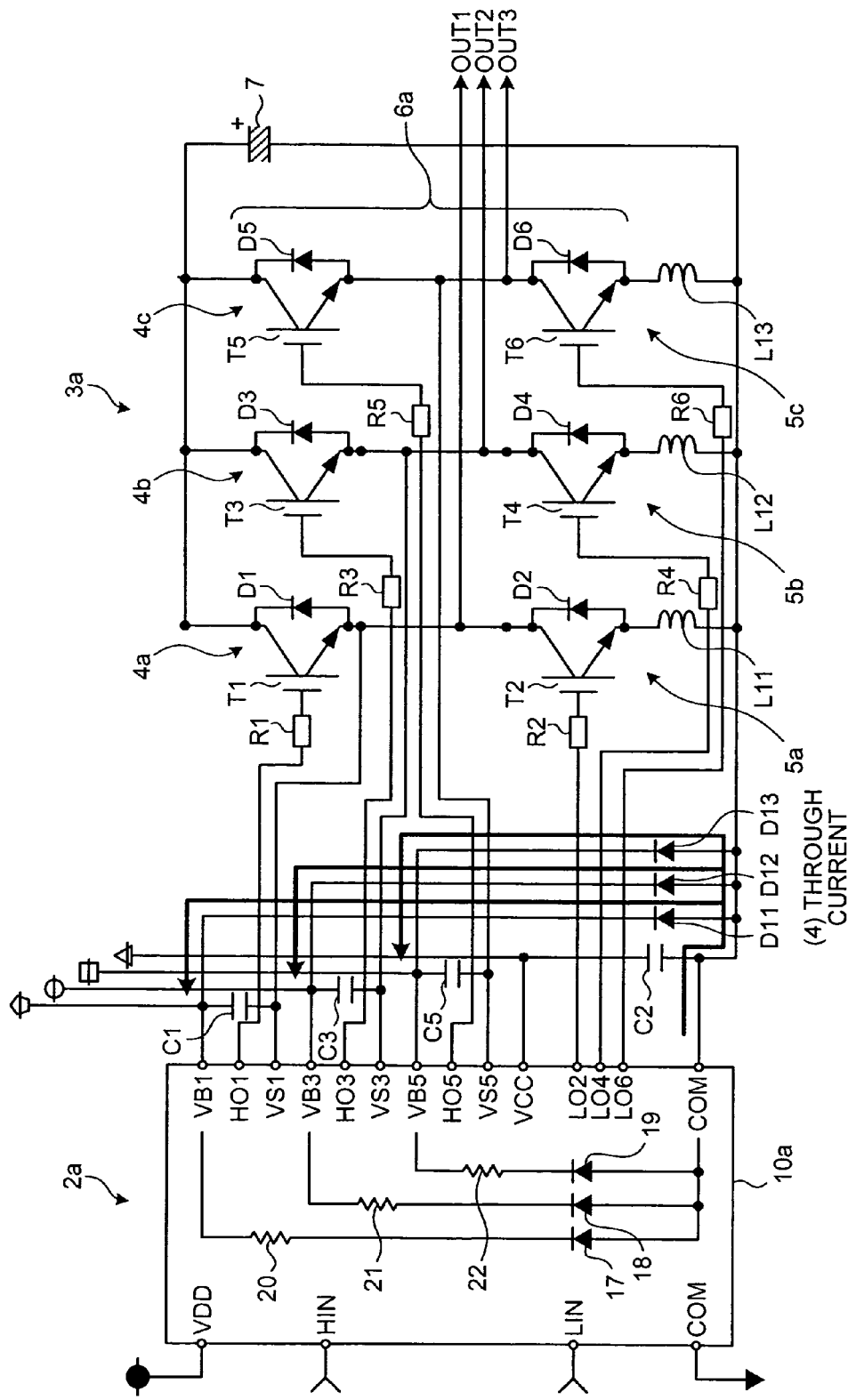
FIG. 4 is a schematic diagram for explaining an inverter device (three-phase inverter configuration: individual power supply) according to a second embodiment of the present invention.

FIG. 4 is a schematic for explaining an inverter device according to a second embodiment of the present invention. The inverter device according to the first embodiment is a single-phase inverter circuit, whereas the inverter device according to the second embodiment is a three-phase inverter circuit. In other words, the inverter device of the second embodiment includes three pairs of switching elements. Specifically, the inverter device of the second embodiment includes an inverter driving unit 2a and an inverter circuit 3a. The inverter circuit 3a includes three upper-arm switching elements T1, T3, T5 and three lower-arm switching elements T2, T4, T6. The driving unit 2a, which includes a high-withstand-voltage IC 10a, drives the six switching elements of the inverter circuit 3a. The structural elements in the second embodiment that are same or equivalent to those in the first embodiment will be denoted by the same reference numerals as in the first embodiment, and overlapping descriptions are simplified or omitted.

The inverter circuit 3a includes a bridge circuit 6a and the DC power supply 7. The bridge circuit 6a includes three upper arm units 4a, 4b, 4c, and three lower arm units 5a, 5b, 5a. The upper arm unit 4a includes the upper-arm switching element T1 and the upper-arm diode D1 connected in reverse-parallel to each other. The upper arm unit 4b includes the upper-arm switching element T3 and an upper-arm diode D3 connected in reverse-parallel to each other. The upper arm unit 4c includes the upper-arm switching element T5 and an upper-arm diode D5 connected in reverse-parallel to each other. The lower arm unit 5a includes the lower-arm switching element T2 and a lower-arm diode D2 connected in reverse-parallel to each other. The lower arm unit 5b includes the lower-arm switching element T4 and a lower-arm diode D4 connected in reverse-parallel to each other. The lower arm unit 5c includes the lower-arm switching element T6 and a lower-arm diode D6 connected in reverse-parallel to each other. A bridge circuit 6a is configured by series connecting the upper arm unit 4a to the lower arm unit 5a, the upper arm unit 4b to the lower arm unit 5b, and the upper arm unit 4c to the lower arm unit 5c. The positive electrode of the DC power supply 7 is connected to the collectors of the upper-arm switching elements T1, T3, T5, and the negative electrode is connected to the emitters of the lower-arm switching elements T2, T4, T6.

The high-withstand-voltage IC 10a drives the upper-arm switching elements T1, T3, T5, and the lower-arm switching elements T2, T4, T6. The high-withstand-voltage IC 10a has various input/output terminals described below. Specifically, the high-withstand-voltage IC 10a has the terminal VDD that is a high-voltage power-supply terminal; the terminal COM that is a reference power-supply terminal; the upper-arm control-signal input terminal HIN; the lower-arm control-signal input terminal LIN, upper-arm-driving high-voltage power-supply terminals VB1, VB3, VB5; upper-arm-driving reference power-supply terminals VS1, VS3, VS5; upper-arm switching-element driving-signal output terminals HO1, HO3, HO5; the lower-arm-driving high-voltage power-supply terminal VCC; the lower-arm-driving reference power-supply terminal COM; and lower-arm switching-element driving-signal output terminals LO2, LO4, LO6.

The upper-arm-driving high-voltage power-supply terminals VB1, VB3, VB5 are connected to the upper-arm-driving reference power-supply terminals VS1, VS3, VS5 via decoupling capacitors C1, C3, C5, respectively. Moreover, the lower-arm-driving high-voltage power-supply terminal VCC is connected to the lower-arm-driving reference power-supply terminal COM via a decoupling capacitor C2.

The upper-arm switching-element driving-signal output terminal HO1 is connected to the upper-arm switching element T1 via a gate resistor R1. The upper-arm switching-element driving-signal output terminal H03 is connected to the upper-arm switching element T3 via a gate resistor R3. The upper-arm switching-element driving-signal output terminal H05 is connected to the upper-arm switching element T5 via a gate resistor R5. Moreover, the upper-arm-driving reference power-supply terminal VS1 is directly connected to the emitter of the upper-arm switching element T1, the upper-arm-driving reference power-supply terminal VS3 is directly connected to the emitter of the upper-arm switching element T3, and the upper-arm-driving reference power-supply terminal VS5 is directly connected to the emitter of the upper-arm switching element T5. Furthermore, the lower-arm switching-element driving-signal output terminals LO2 is connected to the gate of the lower-arm switching element T2 via a gate resistor R2. The lower-arm switching-element driving-signal output terminals L04 is connected to the gate of the lower-arm switching element T4 via a gate resistor R4. The lower-arm switching-element driving-signal output terminals L06 is connected to the gate of the lower-arm switching element T6 via a gate resistor R6. Moreover, the lower-arm-driving reference power-supply terminal COM is directly connected to the emitters of the lower-arm switching elements T2, T4, T6.

The lower-arm-driving reference power-supply terminal COM is connected to the upper-arm-driving high-voltage power-supply terminals VB1, VB3, VB5 via clamp diodes D11, D12, D13, respectively. Specifically, the anodes of the clamp diodes D11, D12, D13 are connected to the lower-arm-driving reference power-supply terminal COM. Thus, in the inverter device according to the second embodiment, the clamp diodes D11, D12, D13 function as a clamping unit that clamps a potential difference between the lower-arm-driving reference power-supply terminal COM and each of the upper-arm-driving high-voltage power-supply terminals VB1, VB3, VB5 to a certain voltage.

Thus, in the inverter device according to the second embodiment, in the same manner as the first embodiment, a substantial portion of the through current that would normally flow into the high-withstand-voltage IC 10a can be drawn to the clamp diodes D11, D12, D13. Accordingly, the through current that flows into the high-withstand-voltage IC 10a can be reduced, and malfunction due to the latch-up phenomenon can be prevented from occurring.

In the inverter device according to the second embodiment, cathodes of the clamp diodes D11, D12, D13 are connected to the upper-arm-driving high-voltage power-supply terminals VB1, VB3, VB5, respectively. Therefore, the current flowing through the clamp diodes D11, D12, D13 can be reduced compared to the current flowing through the clamp diode, for example, disclosed in Patent Documents 1 and 2. Hence, a diode of a smaller current rating compared to the clamp diode disclosed in Patent Documents 1 and 2 can be selected for the clamp diodes D11, D12, D13.

As described above, in the inverter device according to the second embodiment, the clamp diodes D11, D12, D13 are connected between the lower-arm-driving reference power-supply terminal COM and each of the upper-arm-driving high-voltage power-supply terminal VB1, VB2, VB3 of the high-withstand-voltage IC 10a. Each of the diodes D11, D12, D13 clamps potential differences between the lower-arm-driving reference power-supply terminal COM and the upper-arm-driving high-voltage power-supply terminals VB1, VB2, VB3. Therefore, breakdown and malfunction of the high-withstand-voltage IC 10a can be prevented without increasing the circuit scale or cost.

In the second embodiment, the clamp diodes D11, D12, D13 are shown outside of the high-withstand-voltage IC 10a; however, the clamp diode diodes D11, D12, D13 can be provided inside of the high-withstand-voltage IC 10a. However, it is advantageous to provide the clamp diodes D11, D12, D13 outside of the high-withstand-voltage IC 10a; because, in that case it is not necessary to change the design of the high-withstand-voltage IC, i.e., the second embodiment can be applied to an inverter device employing an existing high-withstand-voltage IC.

Furthermore, in the second embodiment, a diode is used as the clamping means; however, the clamping means is not limited to a diode. Any element that turns on at a voltage higher than a certain value and that can output an approximately constant voltage can be used as the clamping means. As the clamping means, for example, a PN junction of a Zener diode or a PN junction of a bipolar transistor can be used.

Third Embodiment

Figure 5:
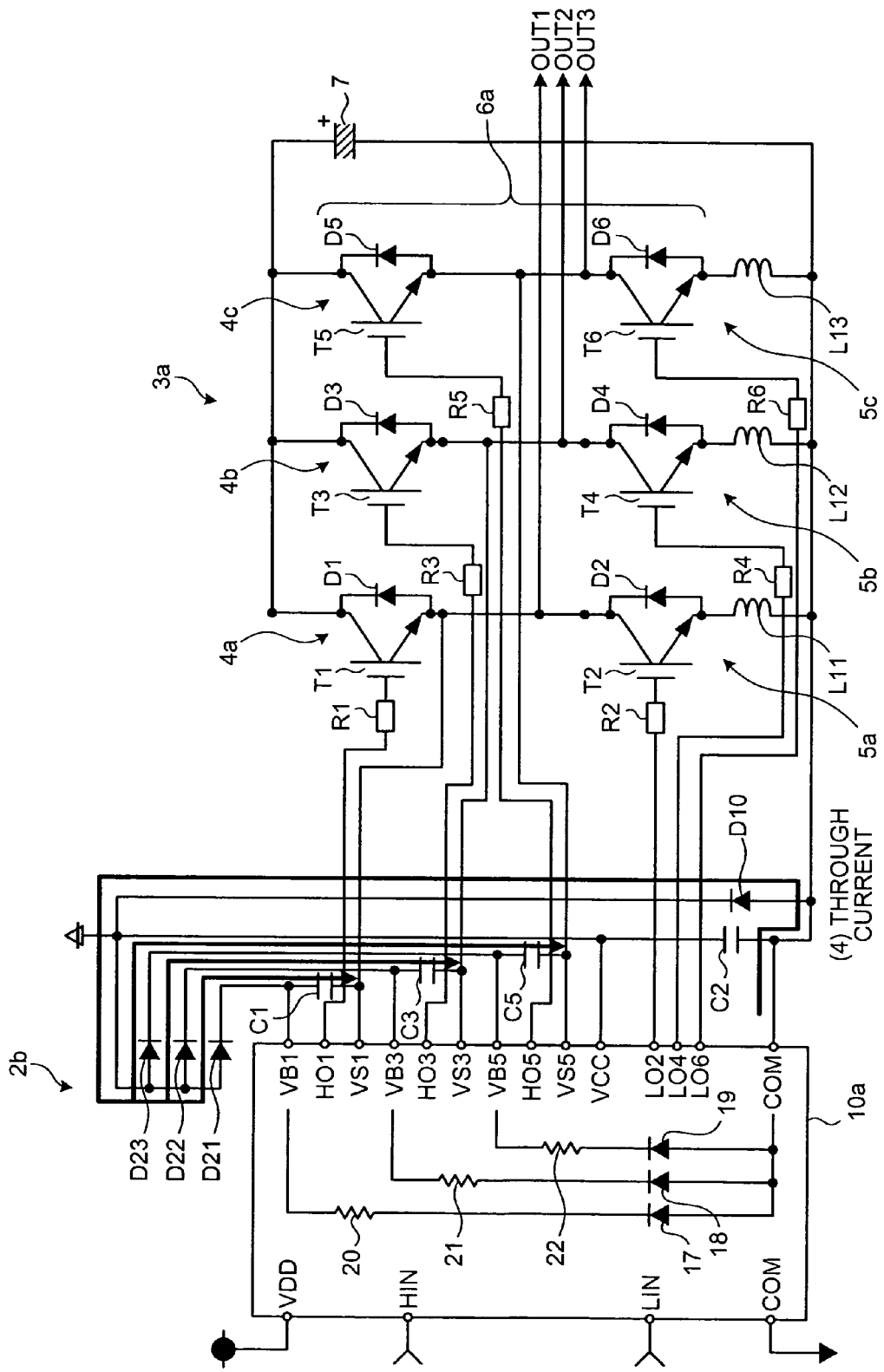
FIG. 5 is a schematic diagram for explaining an inverter device (three-phase inverter configuration: common power supply) according to a third embodiment of the present invention.

FIG. 5 is a schematic for explaining an inverter device according to a third embodiment of the present invention. The inverter device according to the second embodiment employs individual power supplies for individually driving the switching elements of the upper arm units, and employs a common power supply for commonly driving the switching elements of the lower arm units. On the other hand, the inverter device according to the third embodiment employs a common power supply for driving the switching element of both the upper and lower arm units. Therefore, a connection configuration of the clamp diodes in the inverter device according to the third embodiment is different from that in the second embodiment. The other components are same or equivalent to those in the second embodiment and they have been denoted by the same reference numerals as in the second embodiment, and their description has been omitted.

The inverter device according to the third embodiment includes, as a clamping means, a first clamp diode D10 and three second clamp diodes D21, D22, D23. The anode of the first clamp diode D10 is connected to the lower-arm-driving reference power-supply terminal COM, and the cathode is connected to the lower-arm-driving high-voltage power-supply terminal VCC. The anodes of the second clamp diodes D21, D22, D23 are connected to the lower-arm-driving high-voltage power-supply terminal VCC, and the cathodes are connected to the upper-arm-driving high-voltage power-supply terminals VB1, VB3, VB5, respectively. The clamping means clamps the potential differences between the lower-arm-driving reference power-supply terminal COM and each of the upper-arm-driving high-voltage power-supply terminals VB1, VB3, VB5 to a certain voltage.

Thus, in the inverter device according to the third embodiment, in the same manner as the first and second embodiments, a substantial portion of the through current that would normally flow into the high-withstand-voltage IC 10a can be drawn to the first clamp diode D10 and the second clamp diodes D21, D22, D23. Accordingly, the through current that flows into the high-withstand-voltage IC 10a can be reduced, and malfunction due to the latch-up phenomenon can be prevented from occurring.

In the inverter device according to the third embodiment, the cathodes of the second clamp diodes D21, D22, D23 are connected to the upper-arm-driving high-voltage power-supply terminals VB1, VB3, VB5, respectively. Therefore, the current flowing through the second clamp diodes D21, D22, D23 can be reduced compared to the current flowing through the clamp diode disclosed, for example, in Patent Documents 1 and 2. Hence, a diode of a smaller current rating compared to the clamp diode disclosed in Patent Documents 1 and 2 can be selected for the clamp diodes D21, D22, D23.

As described above, in the inverter device according to the third embodiment, the first clamp diode D10 is connected between the lower-arm-driving reference power-supply terminal COM and the lower-arm-driving high-voltage power-supply terminal VCC of the high-withstand-voltage IC 10a, and the second clamp diodes D21, D22, D23 are connected between the lower-arm-driving high-voltage power-supply terminal COM and the upper-arm-driving high-voltage power-supply terminals VB1, VB3, VB5, respectively. The second clamp diodes D21, D22, D23 clamp potential differences between the lower-arm-driving reference power-supply terminal COM and the upper-arm-driving high-voltage power-supply terminals VB1, VB2, VB3, respectively. Therefore, breakdown and malfunction of the high-withstand-voltage IC 10a can be prevented without increasing the circuit scale or cost.

In the third embodiment, the clamp diodes D10, D21, D22, D23 are shown outside of the high-withstand-voltage IC 10a; however, the clamp diode diodes D10, D21, D22, D23 can be provided inside of the high-withstand-voltage IC 10a. However, it is advantageous to provide the clamp diodes D10, D21, D22, D23 outside of the high-withstand-voltage IC 10a; because, in that case it is not necessary to change the design of the high-withstand-voltage IC, i.e., the third embodiment can be applied to an inverter device employing an existing high-withstand-voltage IC.

Furthermore, in the third embodiment, a diode is used as the clamping means; however, the clamping means is not limited to a diode. Any element that turns on at a voltage higher than a certain value and that can output an approximately constant voltage can be used as the clamping means.

As the clamping means, for example, a PN junction of a Zener diode or a PN junction of a bipolar transistor can be used.

INDUSTRIAL APPLICABILITY

As described above, the inverter device according to the present invention can be widely applied to an inverter device including, for example, a single-phase inverter circuit or a three-phase inverter circuit. Moreover, the inverter device according to the present invention is particularly suitable for an inverter device that requires prevention of malfunction and voltage breakdown of a high-withstand-voltage IC.

The invention claimed is:

1. An inverter device comprising:
    an inverter circuit including
        a bridge circuit connected between a positive electrode and a negative electrode of a direct-current power supply, the bridge circuit including
            an upper arm unit including an upper-arm switching element and an upper arm diode connected in reverse-parallel to each other; and
            a lower arm unit including a lower-arm switching element and a lower arm diode connected in reverse-parallel to each other, the lower arm unit being series connected with the upper arm unit;
    an inverter driving unit including a high-withstand-voltage IC that drives switching elements in the upper arm unit and the lower-arm unit, the high-withstand-voltage IC having a first terminal that is a lower-arm-driving reference power supply terminal for supplying a reference voltage to the switching element in the lower arm unit and a second terminal that is an upper-arm-driving reference power supply terminal for supplying a high-voltage to the switching element in the upper arm unit; and
    a clamp unit that clamps a potential difference between the first terminal and the second terminal, wherein the second terminal is not directly connected to the upper arm unit and the clamp unit is connected directly between the first terminal and the second terminal.

2. The inverter device according to claim 1, wherein the inverter circuit is a single-phase inverter circuit.

3. The inverter device according to claim 2, wherein the clamp unit is a clamp diode.

4. The inverter device according to claim 3, wherein a current rating of the clamp diode is smaller than a current rating of the lower arm diode.

5. The inverter device according to claim 3, wherein the clamp diode is provided outside of the high-withstand-voltage IC.

6. The inverter device according to claim 1, wherein the inverter circuit is a three-phase inverter circuit.

7. The inverter device according to claim 6, wherein the clamp unit includes a plurality of clamp diodes each corresponding to each phase of the three-phase inverter circuit.

8. The inverter device according to claim 7, wherein each of the clamp diodes is connected between the first terminal and each of the second terminals.

9. The inverter device according to claim 7, wherein the high-withstand-voltage IC having a third terminal for supplying a high-voltage to the switching element in the lower arm unit, and fourth terminals each for supplying a high-voltage to a switching element in each phase, and the clamp diodes include
    a first clamp diode connected between the first terminal and the third terminal; and
    second clamp diodes each connected between the third terminal and each of the fourth terminals.

10. The inverter device according to claim 1, wherein the high-withstand-voltage IC further includes a third terminal for supplying a reference voltage to the switching element in the upper arm unit.

11. The inverter device according to claim 10, wherein the third terminal of the high-withstand-voltage IC is directly connected to the switching element in the upper arm unit.

12. The inverter device according to claim 10, wherein the high-withstand-voltage IC further includes a fourth terminal for supplying a high-voltage to the switching element in the lower arm unit.

13. The inverter device according to claim 10, wherein the second terminal and the third terminal of the high-withstand-voltage IC are connected with a decoupling capacitor therebetween.

14. The inverter device according to claim 12, wherein the first terminal and the fourth terminal of the high-withstand-voltage IC are connected with a decoupling capacitor therebetween.

15. The inverter device according to claim 12, wherein the third terminal and the fourth terminal of the high-withstand-voltage IC are not directly connected to the clamp unit.

* * * * *